United States Patent [19]

Rosenblatt

[11] Patent Number: 5,276,993
[45] Date of Patent: * Jan. 11, 1994

[54] SPONGE LURE

[76] Inventor: Solomon Rosenblatt, 320 Seaview Ct., Marco Island, Fla. 33937

[*] Notice: The portion of the term of this patent subsequent to Dec. 15, 2009 has been disclaimed.

[21] Appl. No.: 979,260

[22] Filed: Nov. 20, 1992

Related U.S. Application Data

[63] Continuation of Ser. No. 740,942, Aug. 6, 1991, Pat. No. 5,170,580.

[51] Int. Cl.⁵ ............................................. A01K 85/00
[52] U.S. Cl. .................................. 43/42.06; 43/42.24
[58] Field of Search ............................. 43/42.06, 42.24

[56] References Cited

U.S. PATENT DOCUMENTS

| | | | |
|---|---|---|---|
| 2,129,245 | 9/1938 | Stenstrom | 43/42.26 |
| 4,083,906 | 4/1978 | Schindler et al. | 264/49 |
| 4,098,728 | 7/1978 | Rosenblatt | 521/141 |
| 4,553,966 | 11/1985 | Karteweg | 604/317 |
| 4,856,223 | 8/1989 | Evans | 43/42.24 |
| 5,170,580 | 12/1992 | Rosenblatt | 43/42.06 |

FOREIGN PATENT DOCUMENTS 2499826  8/1982  France .................... 43/42.06

Primary Examiner—Richard K. Seidel
Assistant Examiner—James Miner
Attorney, Agent, or Firm—Ostrolenk, Faber, Gerb & Soffen

[57] ABSTRACT

A fishing lure is described which is wholly or in part comprised of hydroxylated polyvinyl acetal sponge. The sponge may include a fish attractant. The lure looks and may smell like natural bait, and achieves a desired more natural action of a lure with a much longer lived attractant functionality.

2 Claims, 1 Drawing Sheet

SPONGE LURE

This is a continuation of application Ser. No. 740,942, filed Aug. 6, 1991 now U.S. Pat. No. 5,170,580.

BACKGROUND OF THE INVENTION

1. Field of the invention

The present invention relates to fishing and, more particularly, to a lure for use in fishing.

2. Description of the Related Art

Studies have indicated that fish are attracted to food from its movement and/or vibrations produced therefrom in the water, as well as its odor or scent. Heretofore, artificial lures have been principally designed to duplicate movement, color, or otherwise give the impression of natural bait, and such lures are currently sold in a myriad of designs to attract each type and variety of game fish. More recently, existing compounds have been found or have been made synthetically or biochemically reproduced or obtained by natural extraction, to duplicate the scent of natural bait. These scientifically formulated attractants are claimed to have proven effectiveness to stimulate a fish's predatory instincts, so that an otherwise inactive fish will begin to hunt for food and be attracted to the lure from which these scents emanate. A taste component which compliments the attractant stimulants, is utilized to mask any offensive odors from the fisherman handling the bait during the baiting process. Currently, in order to create a "smell path", these attractants are topically applied to the fisherman's favorite lure before use. However, it has been found that the attractant's characteristics soon washes off the impervious metallic or plastic surface of the lure, and the attractant's characteristics are soon lost. Oil based attractants soon flush to the surface, losing their effectiveness. Water soluble or miscible attractants are equally short lived, as these coatings are soon dissolved into the aqueous environment. Therefore, these attractants must be applied every 7-15 casts, which is both tedious and expensive.

The prior art has sought to overcome these disadvantages with a compromised fish attractant system by offering a material consisting of an attractant impregnated into a cellulose sponge or a cloth reinforced urethane sponge combination, which are shaped into thin strips or triangles, and these pieces are added onto a plain hook or hooks of conventional lures. The disadvantage of this prior art is that these impregnated sponge pieces have limited effectiveness, because their shapes do not resemble a natural bait. Also, if used as an appendage on a preexisting lure, the sponge piece will alter the movement of the lure through the water since the lure was designed to move through the water without these appendages. These triangular sponge strips have no physical resemblance to a lure, produce no special movement on their own, and therefore when used in conjunction with a mechanical lure, function only as a reservoir for the scent attractant.

Even though the prior art mentions use of sponge as a component of a lure, there is no prior art indicating the substitution of a castable sponge material for the entire lure in the original design of the lure, e.g. molding the lure from sponge rather from another material, such as substituting sponge for the soft polyvinyl chloride plastisol worms or other rubbery substances of which many lures are now composed. Even though the prior art anticipated the benefit of a sponge as an absorbent for the fish attractant, it did not anticipate the sponge as the entire lure, encompassing design details such as ridges, tapered appendages etc., like the lure bait. The prior art did not anticipate this invention because there was no conception of a sponge with the strength, pore volume and formability, including castability, of the hydroxylated polyvinyl acetal (HPVA) material used in the present invention.

U.S. Pat. No. 3,940,869 to Roberts teaches a lure cut from a compressible sponge which, upon wetting, expands, but only teaches cutting, not casting into shapes, nor molding, and only teaches cellulose sponge, not HPVA sponge or any other sponge which may be also compressible. The expandability of the sponge hides the hook, although a pre-expanded sponge can do the same. Expandability to hide hooks is also taught in a later patent, U.S. Pat. No. 4,744,167 to Steele. Cutting and not casting limits shapes possible as the spherical or contoured aspects of natural food cannot be duplicated. In addition, cellulose is also a non-stretchable material, tears and controllable pore size and, cannot be molded as commercially available, and has poor abrasion resistance, and therefore will soon lose integrity. Casting a foam lure is not suggested by these patents because commercial cellulose sponge is not castable. In addition, the lures die cut from sheet cellulose sponge are inferior in physical characteristics to HPVA sponge as will be discussed below.

U.S. Pat. No. 2,797,519 to Keller teaches an artificial lure including a bendable metal base and any porous material, sponge, rubber or any resilient plastic. The bendable component shapes the lure, and is motion influencing. The porous material or plastic is capable of being impregnated with a fish scent and textured. This patent is non-specific to the type of material.

U.S. Pat. No. 4,856,223 to Evans teaches a method of manufacturing a lure made by the combining of plastics with a foamed plastic, porous textile or natural material. The textured surface of the foam provides an improved means for detecting a fish biting. Industrial foams mentioned are filter foams, e.g. polyester polyurethanes. No mention is made of HPVA sponge.

U.S. Pat. No. 3,410,689 to Nathan teaches a mass of foamed plastic having fish attractant combined therein during the formation of the foam. The fish attractant disjoins the foamed mass when submerged in water.

U.S. Pat. No. 4,736,542 teaches a rigid absorbent body constructed of fibrous absorbent material, e.g. felt, into which is impregnated fish oil attractant.

U.S. Pat. No. 3,953,934 to Visser teaches a similar device except the body of the lure is made of a sintered metal. The disadvantage of sintered metal is that vacuum pressure is required to reasonably impregnate the fine pores of the metal foam.

U.S. Pat. No. 4,744,167 teaches a lure including a sponge that prevents hook points from snagging underwater objects; however, the deformability of the sponge allows the fish to be caught on the hooks when the fish's bite deforms the sponge. The sponge is used as an improvement, e.g. part of a spinner arrangement, and not as a lure per se.

U.S. Pat. No. 3,958,357 to Frank teaches a prepackaged fish bait consisting of a porous tubular container filled with the bait which, when threaded on the hook, prevents the bait from prematurely coming off, premeasures the amount of bait, allows slower release of fish attractant component from the bait, camouflages the hook, and minimizes handling by the fisherman.

In the above mentioned prior art describing lures or lure components of cellulose, urethane, polyester urethanes, fibrous materials and cloth, the use of HPVA sponge in accordance with the invention improves the properties of all these lures because of the overall superior physical properties of the HPVA sponge material.

For example, urethane and polyester urethane foams have less tear strength, less hydrophilicity, less chemical stability to light, less chemical stability towards hydrolysis, more notch sensitivity to propagating a tear around hook protrusions, are less easily dyed or pigmented, are less easy to impregnate and do not hold onto the impregnate with fish attractant because of smoother internal pore geometry than HPVA sponge.

Cellulose sponges have poor tear resistance, shred, support mildew and bacterial attacks, have poor chemical and color stability, elongation, flexibility and abrasion resistance, cannot be molded, and cannot make thinner cross sections. Felts, cloths and sintered metals have low impregnation capacity, poor bait-like texture, and are difficult to fabricate.

SUMMARY OF THE INVENTION

The present invention seeks to overcome the deficiencies of the prior art by designing a mechanically effective lure made essentially from an improved, synthetic, open celled sponge, or porous elastomeric material that both looks and can be made to smell like a natural bait allowing for life like appearance with superior fish attractant capacity. This material achieves the desired more natural action of a lure with a much longer lived attractant functionality, since the volume of the whole lure can function as an attractant reservoir. Furthermore, to control the release of the attractants necessary to create an effective odor path, the attractant may be combined with certain controlled release water soluble polymers and materials, as will be discussed in more detail below, and impregnation of these controlled release attractants combinations into the pores of the sponge lure further enhances attractant longevity, and also allows for use of superior attractants that are too water soluble or too expensive when used by themselves. This invention makes it possible to combine, in one unit, the desirable movement properties of a lure, high attractant absorption capacity, and good mechanical strength by using a synthetic polymeric open celled HPVA sponge with superior physical properties, that is formable and absorbent for the body of the lure.

In particular, the invention provides a fishing lure comprising hydroxylated polyvinyl acetal sponge which may contain a fish attractant. Preferably, the lure includes means, such as one or more ridges and/or appendages or a shapeable metal component, for making the lure move in a life-like manner when it is in use. The lure may contain a hook, pigment or dyes for coloring and means for weighting or imparting buoyancy to the sponge, the weighting or buoyance means preferably being located within the sponge.

The invention also provides a method of use of the HPVA sponge as a fishing lure.

BRIEF DESCRIPTION OF THE DRAWINGS

Having reference to the drawings wherein like reference numbers designate the same parts in all the views.

DETAILED DESCRIPTION OF THE PREFERRED EMBODIMENTS

Figure 1:
FIG. 1 shows a molded hydroxylated polyvinyl acetal sponge in the shape of an eel designed to duplicate the motion of a natural food when in use. A fish hook may be passed anywhere through the body of the lure to attach the eel securely to the hook.
Figure 2:
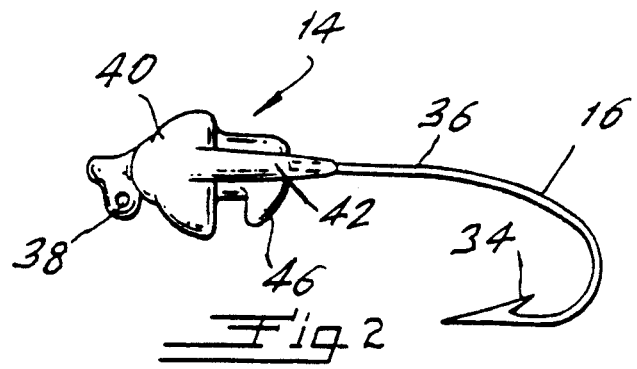
FIG. 2 shows a weighted hook-head assembly which serves the purpose of supplying internal weight of the lure, a hood, and a diving plane to regulated its depth. This weighted hook/head assembly, is entirely conventional and includes a hook 16 and a bard 34, and shank 36 and an eye 38 for attachment to the terminal tackle. The head 14 is cast from lead around shank 36 and comprises a generally conical tip 40, two laterally and rearwardly extended diving planes 42, 44 and an axial knob 46.
Figure 3:
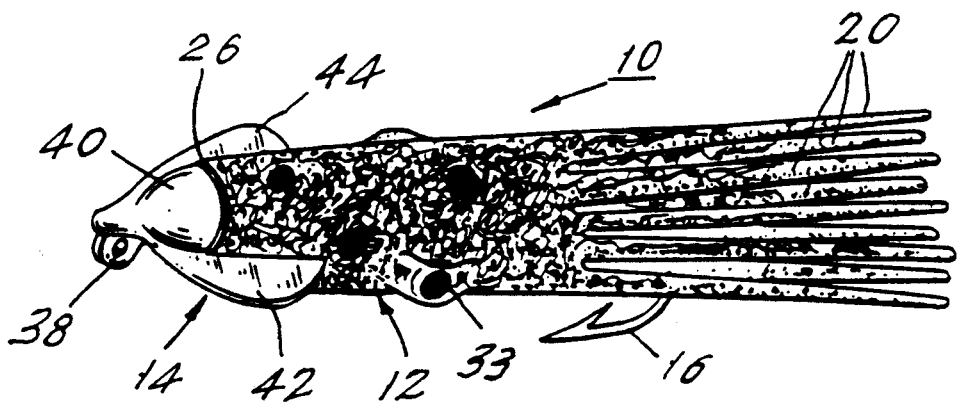
FIG. 3 shows a molded hydroxylated polyvinyl acetal tubular sponge lure 10, in the shape of a squid having a body portion 12 and eyes 33 and numerous appendages to duplicate the tentacles of a natural squid 20, fitted to a weighted head with extended diving planes 42 and 44 and hook 16. The body of the lure is attached to the hook of FIG. 2 by first passing hook 16 through opening 26 and then forcing opening 26 over knob 46 thereby locking the forward wall surrounding opening 26 snugly against the base of 40.
Figure 4:
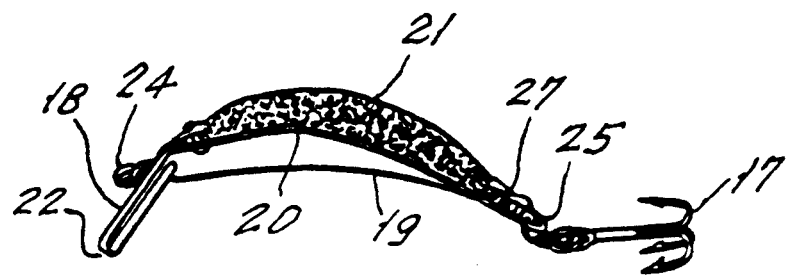
FIG. 4 shows a lure wherein the lure consists of a hydroxylated polyvinyl acetal component attached to a shapeable metal or rigid strip that influences the movement of the lure when in use. Base member 20 is in the form of a sheet metal strip or some bendable metal such as aluminum or copper, while the body member 21 is hydroxylated polyvinyl acetal sponge. The body member may also be in strip form in most instances although it may be pleated, twisted, or otherwise distorted when it is attached to the base member to simulate bait of difference actions. The base and body members 20 and 21 of lure are secured together by bending a portion of the base member into a clamping engagement with the body member and/or attached by a suitable adhesive or other attachment technique. The base member 20, in addition to being bent at 22 to engage the front portion of the body member is also bent or folded back on itself at 25 adjacent to its rear end to clamp the rear portion 27 of the body member. The lure is provided with a substantially flat, obliquely disposed "nose" or lip or front portion 18 and serves to produce, by bending, an adjustable swimming, diving or bobbing motion as the lure is pulled through the water. For relatively light, small or flexible lures, an added reinforcing member is provided in the form of a thin steel wire 19 which extends from the eye of the lure 24 to the hooks 17.

Configurations of the lure of the invention are typical for such sponge lures, with or without an attractant, and have mechanical movement in water which attracts a fish. They are replicas of other rigid or soft lures, e.g. highly plasticized polyvinyl chloride gel worms, rubbery plastic crawfish, frogs, salmon eggs, helgramites, shrimps, minnows, insects, sand worms, etc. All these configurations can be duplicated using the superior, formable HPVA sponge material of the invention, and if impregnated, have the additional attribute of having a larger absorption capacity of fish attractants, combined with more life-like movement. However, these sponge type lures do not have to be impregnated, and can be used like other soft lures, under circumstances where attractants are not required to catch fish, or fished when attractants have dissipated.

In addition to the superior absorption capacity of attractant, HPVA sponge lures in accordance with the invention have the following improved benefits as compared to other sponges in the prior art.

1) Soft, flesh like texture, which is more natural than conventional hard plastics, cellulose sponges, wood, metal or polyvinyl chloride plastic gels.

2) When properly chosen, this foam has the capability of life-like flexibility in the water, and can be tapered, during the forming process, to replicate fins, tails and appendages.

3) The pore size of the foam can be chosen to give a scale like outer surface

4) Has excellent tear resistance resulting in longer life from multiple fish bites.

5) Has good tissue traction in the fish's mouth (less slippery against the mouth tissue). This is in addition to less tendency of all larger open cell foams to be prematurely pulled out of the fish's mouth because the open pores of the foam tend to get entangled in the teeth of the fish. As compared to smooth, non-porous metal or plastic lures, these entanglements and tissue traction properties more quickly send the fisherman the message that a bite is taking place.

6) Hooks can be easily placed by the fisherman or manufacturer by conventional threading or molding into various locations on the sponge lures with more security as compared with other soft plastics because the incorporated hooks do not weaken the lure as in plastic gel lures, because the flexibility, stretchability and strength of the sponge allows hook penetration with creating weak points at all sponge entrance points of the hooks.

To maximize both the mechanical action and fish attractant capacity of a sponge lure, ideally the sponge component should have the following characteristics:

---

1. More than 90% pore volume;
2. Open cells, easily impregnable;
3. High tensile strength;
4. High flexibility;
5. Good elongation with minimum notch tear sensitivity;
6. Maintains its shape in the water;
7. Inert (e.g. will not generate any fish repellant properties);
8. Will not, in itself, support bacterial or fungal growth;
9. Hydrophilic, e.g. like natural bait;
10. Controllable pore size to give further latitude in physical properties, e.g. flexibility;
11. Can be easily dyed or pigmented;
12. Chemically stable against attack by salt or plain water, ultra violet light, or oxygen degradation upon long term storage;
13. Easily moldable, three dimensional rounder shapes, or cut by conventional tools;
14. Capable of producing a flesh or scale like texture;
15. Softly expandable around the hooks when immersed in water to prevent snagging of hooks on vegetation or craggy bottoms;
16. Castable about a shapeable metal insert;
17. Castable about hollow spheres or weights to control buoyancy;
18. Insert moldable or bondable to the body of a pre-shaped live design lure for texture enhancement or added fish attractant reservoir.

---

Although the present invention proposes a combination in one unit of the desirable mechanical and movement properties of a lure with high attractant absorbent capacity by using a superior HPVA sponge matrix, the invention is not limited to the requirement that the lure have a specific shape resembling a lure. The superior physical properties of HPVA sponge over the currently used cellulose and urethane foam cloth combination strips and triangles allows for an improvement of those products and the substitution of HPVA sponge for these applications is with the scope of the present invention. HPVA sponge is superior to the material used in the prior art because it is much stronger than cellulose and does not require a cloth reinforcement as does urethane sponge impregnated cloth. Furthermore, for commercial fishing applications including lobster trapping and long, multiple hook lines where a smell path only may be the predominant attraction, the shape of the sponge may not be important. Therefore, the invention includes the use of HPVA sponge to function only as an attractant reservoir and of a nondescript design for these applications.

The preferred polymeric composition of the sponge is based on polyvinyl acetal foams, insolubilized with aldehydes, to form hydroxylated polyvinyl acetal foamed polymers (HPVA sponges) The HPVA sponge used in the fishing lure in accordance with the invention is set forth in U.S. Pat. No. 4,098,728 to Rosenblatt, which is herein incorporated by reference, for use in surgery. That patent however, does not teach or suggest the use of HPVA sponge for a fishing lure.

The fish attractant which may be impregnated into the HPVA sponge may be any suitable fish attractant. Preferred fish attractants include those derived from any existing natural bait, i.e., squid, shrimp, herring, etc. or other bait, as taught by U.S. Pat. No. 4,463,018, which is herein incorporated by reference. An effective amount of fish attractant is incorporated into the fishing lure of the invention. Preferably, the lure includes about 0.1 to about 30% by weight of fish attractant based upon the weight of the lure, although the use of other amounts of fish attractant in the lure of the invention is also within the scope of the invention. The attractant impregnate may include controlled release water soluble polymers and/or other materials in effective amounts to control the release of the attractants from the HPVA sponge. Preferably the lure includes less than about 1 wt% of such materials based upon the weight of the lure, the use of other amounts of such materials also being within the scope of the invention. Examples of typical controlled release gels that are mixable with an attractant to control attractant release when impregnated into the pores of the sponge lure are hydroxethyl methacrylic acids and other acrylic gels, carboxymethyl celluloses, natural gums, e.g. kelginates, cyanoacrylic adducts of cellulose, partially hydrolyzed polyvinyl alcohols etc.

Formulations of HPVA foams in accordance with the invention are illustrated in the following examples:

EXAMPLE 1

This example illustrates the method of this invention for forming a sponge having a uniformly small pore size distribution of between 0.1 mm and about 0.5 mm. Into a rotary beater was mixed 554 grams of a medium molecular weight fully hydrolyzed polyvinyl alcohol with 4725 grams of cold water which was mixed until a smooth paste was achieved. The temperature of the paste then was raised to 180° F. and mixing was effected for about 5 minutes at this temperature. The mixture was then cooled to 115°-120° F. and 17 grams of Triton X-100 wetting agent was added and the resultant mixture was agitated for ten minutes. 815cc of 50% sulfuric acid at a temperature of 110°-120° F. was added to the mixture and mixed so that its volume was 9800cc. Thereafter, 585cc of 37% aqueous formaldehyde solution 100°-110° F. was added slowly to the mixture and was agitated for 60 seconds. The temperature of the mix was about 110°-115° F. and the volume was about 12,600cc. The beaters were then rotated in a reverse direction at 1/6 of the original speed for one minute until the observed rise of larger bubbles in the froth ceased. Reverse mixing was continued while the mix became noticeably thicker. This froth then was extruded into a plastic mold that had been previously heated to 160° F. The froth was cured in the mold for 1 hour at 140° F. and the mold was then removed from the oven and cured at 80°-110° F. for 20 hours. Thereafter, the mold was opened and the sponge obtained was washed by alternately running it through water and rubber rolls until the rinse water had a pH of not lower than 6.0.

EXAMPLE 2

This example illustrates the method of this invention for forming a sponge having a uniformly medium pore size of between 0.3 mm and about 1.0 mm. Into a rotary beater was mixed 475 grams of a medium molecular weight fully hydrolyzed polyvinyl alcohol with 4050 grams of cold water which was mixed until a smooth paste was achieved. The temperature of the paste then was raised to 180° F. and mixing was effected for about 5 minutes at this temperature. The mixture was then cooled to 110°-120° F. and 15 grams of Triton X-100 wetting agent was added and the resultant mixture was agitated for 5 minutes. 700cc of 50% sulfuric acid at a temperature of 110° F. was added to the mixture and mixed so that its volume was 9800cc. Thereafter, 500cc of 37% aqueous formaldehyde solution at 100°-110° F. was added slowly to the mixture and was agitated for 60 seconds The temperature of the mix was about 105° F. to 108° F. and the volume was about 12,600cc. The beaters then were rotated in a reverse direction for 1 minute at 1/6 the original speed until the observed rise of larger bubbles in the froth ceased. Reverse mixing was continued while the mix became noticeably thicker. This froth then was extruded into a plastic mold that had been previously heated to 160° F. The froth was cured in the mold for 1 hour at 140° F. and the mold was then removed from the oven and cured at room temperature for 20 hours. Thereafter, the mold was opened and the sponge obtained was washed by alternately running it through water and rubber rolls until the rinse water had a pH of 6 minimum.

EXAMPLE 3

This example illustrates the method of this invention for forming a sponge having a uniformly large pore size of about 0.5 mm and about 4.0 mm. Into a rotary beater was mixed 360 grams of a medium molecular weight fully hydrolyzed polyvinyl alcohol with 3010 grams of cold water which was mixed until a smooth paste was achieved. The temperature of the paste then was raised to 180° F. and mixing was effected for about 5 minutes at this temperature. The mixture was then cooled to 110° to 120° F. and 10 grams of Triton X-100 wetting agent was added and the resultant mixture was agitated for 12 minutes at high speed. Thereafter, 525cc of water at 120° F. was added in the mixture and then was agitated for 10 minutes. 525cc of 50% sulfuric acid at a temperature of 110° F. was added to the mixture and was agitated for 60 seconds. The temperature of the mix was about 108° F. to 110° F. and the volume was about 15,000cc. The beaters were then rotated in a reverse direction for one minute at 1/6 the original speed until the observed rise of larger bubbles in the froth ceased. Reverse mixing was continued while the mix became noticeably thicker. This froth then was extruded into a plastic mold that had been previously heated to 160° F. The froth was cured in the mold for 1 hour at 140° F. and the mold then was removed from the oven and cured at room temperature for 20 hours. Thereafter, the mold was opened and the sponge obtained was washed by alternately running it through water and rubber rolls until the rinse water had a pH of 6 minimum.

EXAMPLE 4

The sponge of Example #3 was post impregnated with a mixture of a 5% concentration of polyhydroxyethyl methacrylate and 3% salmon oil in methyl alcohol. The alcohol was allowed to evaporate at 120° F. leaving the gel/attractant forming particles distributed homogeneously throughout the sponge matrix. The sponge was then immersed in water and allowed to completely saturate. A control sponge of exactly the same dimensions (¾ inches wide ×3 inches long) without the gel particles was saturated simultaneously with the same water. Both sponges were then subjected to a hydrostatic pressure of 7 psi, for 15 minutes and examined for appearance and water loss. The sponge containing the gel/attractant particles when swelled in water took on the appearance of a stick of jello The control sponge was more soft to the touch and easily released water under slight pressure. The gelled fish oil-containing sponge picked up 19 times its own weight while the control, 24 times its own weight in water. After application of 7 psi pressure, the sponge containing the gelled fish oil retained 93% of its water while the control retained 61% of its water. The gelled fish oil slowed the rate for total water release from 30 seconds, for the control, to about 168 seconds for the gel sponge.

It has been found that this type of sponge has most of the desirable characteristics outlined above. The processes taught in U.S. Pat. No. 4,098,728 discussed above allow for variation in pore size, sponge density (pore volume), and to control other variables, which are also necessary to optimize a sponge lure design.

Whereas the aforementioned examples demonstrate one process for making hydroxylated PVA foam, other processes are also possible. An example of another process is Example #5. Pore sizes can be varied in this process by changing the type of starch.

EXAMPLE 5

Into a rotary beater mix 450 grams of potato starch and 2,500 grams of 150° F. water. Mix until a smooth paste is achieved. Add 100° F. solution of 9,000 grams of 10% solution of a medium molecular weight, fully hydrolyzed polyvinyl alcohol, 1,800 grams of 50% sulfuric acid, and stir until homogeneous with minimum air entrainment. Add to the mix 1,250 grams of room temperature 37% formaldehyde slowly and agitate for an additional two minutes. The final temperature of the mix should be about 120° F. Pour the mix immediately into one or more sealable molds and place molds in a 120°-140° F. curing oven or constant water temperature bath. After 24 hours remove cured sponges from the mold and wash until the rinse water has a pH of not less than 6.0.

Other processes for making HPVA sponges may be equally effective for producing such lures and therefore these examples should not be considered limitations.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. In a fish lure, the improvement comprising the use of hydroxylated polyvinyl acetal sponge as at least part of the lure.

2. In a method of attracting a fish using a lure, the improvement comprising the step of using hydroxylated polyvinyl acetal sponge as the lure to attract the fish.

* * * * *